(12) United States Patent
Das et al.

(10) Patent No.: US 9,312,695 B2
(45) Date of Patent: Apr. 12, 2016

(54) CONDITION-BASED MANAGEMENT OF POWER TRANSFORMERS

(71) Applicant: International Business Machines Corporation, Armonk, NY (US)

(72) Inventors: Kaushik Das, Bangalore (IN); Jagabondhu Hazra, Bangalore (IN); Nis Jespersen, Copenhagen (DK); Balakrishnan Narayanaswamy, Bangalore (IN); Devasenapathi Periagraharam Seetharamakrishnan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 13/759,544

(22) Filed: Feb. 5, 2013

(65) Prior Publication Data

US 2014/0222375 A1   Aug. 7, 2014

(51) Int. Cl.
G06F 17/18 (2006.01)
H02J 3/00 (2006.01)
G06Q 10/00 (2012.01)

(52) U.S. Cl.
CPC .. *H02J 3/00* (2013.01); *G06Q 10/00* (2013.01)

(58) Field of Classification Search
CPC ......... G06F 17/18; G06F 17/00; G06F 17/11; H02J 2003/003
See application file for complete search history.

(56) References Cited

U.S. PATENT DOCUMENTS

| 7,377,689 | B2 | 5/2008 | Balan |
| 8,126,685 | B2 | 2/2012 | Nasle |
| 2002/0161558 | A1 | 10/2002 | Georges et al. |
| 2007/0050302 | A1 | 3/2007 | Cheim et al. |
| 2009/0312880 | A1 | 12/2009 | Venturini Cheim et al. |
| 2009/0312881 | A1 | 12/2009 | Venturini Cheim et al. |
| 2010/0188240 | A1 | 7/2010 | Wells |
| 2012/0092114 | A1 | 4/2012 | Matthews |

FOREIGN PATENT DOCUMENTS

CN   102315813 A   1/2012

OTHER PUBLICATIONS

Shahbazi et al., A New Approach for Transformer Overloading Considering Economic Terms, 2007 IEEE, pp. 54-57.*
Abu-Elanien et al., Asset Management Techniques for Transformers, Electric Power Systems Research, 2010, vol. 80, pp. 456-464.*
Downing, D. J. et al, "Economic Analysis of Efficient Distribution Transformer Trends," Technical Report, Oak Ridge National Laboratory, Lockheed Martin, 70 pages, Mar. 1998, Lockheed Martin Energy Research Corporation for the United States Department of Energy, Oak Ridge, Tennessee, USA.

(Continued)

*Primary Examiner* — Toan Le
(74) *Attorney, Agent, or Firm* — Ference & Associates LLC (57) ABSTRACT

Methods and arrangements for managing implementation of a power transformer. There is determined at least one parameter currently relating to operation of a transformer, as well as a revenue value currently assigned to the transformer. There is determined a depreciation value currently assigned to the transformer. There is determined a power output for the transformer for a future time slot that increases total revenue with respect to a life cycle of the transformer, the power output being determined based on the at least one parameter, the revenue value, and the depreciation value.

14 Claims, 4 Drawing Sheets

(56) References Cited

OTHER PUBLICATIONS

Bhandari, S. S. et al., "Decision Model for Life Cycle Assessment of Power Transformer during Load Violation," International Journal of Engineering Science and Technology, 2010, pp. 1147-1154, vol. 2, No. 5, Engg Journal Publications, Chennai, India.

Bajracharya, G. et al., "Optimization of condition-based asset management using a predictive health model," Technical Report, Aug. 2009, 8 pages, Delft University of Technology, Delft Center for Systems and Control, Delft, The Netherlands.

Heywood, Richard et al., "Power Transformer Condition Monitoring and Life-Cycle Management—Experience from a Detailed Case Study," Euro TechCon 2009, Nov. 17-18, 2009, 15 pages, Stretton, Warrington, United Kingdom.

Abu-Elanien, Ahmed E. B. et al., "Asset management techniques for transformers," Electric Power Systems Research, 2010, pp. 456-464, vol. 80, Elsevier, B. V., Amsterdam, The Netherlands.

\* cited by examiner

FIG. 1

$$\begin{aligned}
&\underset{x^1,\ldots,x^T}{\text{maximize}} E\left[\sum_{t=1}^{T} x^t P^t - Loss^t(x^1,\ldots,x^T)\right] \\
&\text{subject to} \\
&0 \leq x^t \leq X_{max} \; \forall \, t \\
&0 \leq x^t \geq D_t \; \forall \, t
\end{aligned}$$

CONDITION-BASED MANAGEMENT OF POWER TRANSFORMERS

BACKGROUND

Generally, electrical power demand has been on the rise throughout the world. However, in view of typical economic constraints, it is not normally easy to expand power transmission and distribution proportionately. Because of unplanned overuse, grid assets (particularly, transformers) are increasingly failing before reaching their rated life, which could be 20 to 30 years, or even longer. Since power transformers typically represent highly critical and expensive assets, their premature failure can result in huge economic losses to utilities.

Generally, there are conventional approaches to problems such as those just described, and these mainly involve monitoring the health of transformers, life cycle assessment of transformers, and the monitoring of overloading of transformers due to mismatches between generation and load. Such approaches do not consider real-time pricing, revenue earned on a real-time (e.g., daily) basis, and loss of transformer life on a real-time basis. ("Realtime" as used herein means current or contemporaneous in time, e.g., at least one realtime parameter is at least one contemporaneous parameter.)

BRIEF SUMMARY

In summary, one aspect of the invention provides a method of managing implementation of a power transformer, the method comprising: utilizing a processor to execute computer code configured to perform the steps of: determining at least one parameter currently relating to operation of a transformer; determining a revenue value currently assigned to the transformer; determining a depreciation value currently assigned to the transformer; and determining a power output for the transformer for a future time slot that increases total revenue with respect to a life cycle of the transformer; the power output being determined based on the at least one parameter, the revenue value, and the depreciation value.

Another aspect of the invention provides an apparatus for managing implementation of a power transformer, the apparatus comprising: at least one processor; and a computer readable storage medium having computer readable program code embodied therewith and executable by the at least one processor, the computer readable program code comprising: computer readable program code configured to determine at least one parameter currently relating to operation of a transformer; computer readable program code configured to determine a revenue value currently assigned to the transformer; computer readable program code configured to determine a depreciation value currently assigned to the transformer; and computer readable program code configured to determine a power output for the transformer for a future time slot that increases total revenue with respect to a life cycle of the transformer; the power output being determined based on the at least one parameter, the revenue value, and the depreciation value.

An additional aspect of the invention provides a computer program product for managing implementation of a power transformer, the computer program product comprising: a computer readable storage medium having computer readable program code embodied therewith, the computer readable program code comprising: computer readable program code configured to determine at least one parameter currently relating to operation of a transformer; computer readable program code configured to determine a revenue value currently assigned to the transformer; computer readable program code configured to determine a depreciation value currently assigned to the transformer; and computer readable program code configured to determine a power output for the transformer for a future time slot that increases total revenue with respect to a life cycle of the transformer; the power output being determined based on the at least one parameter, the revenue value, and the depreciation value.

A further aspect of the invention provides a method comprising: predicting a future load distribution for a power transformer; predicting future ambient weather data relative to the power transformer; developing a cost distribution relative to future operation of the transformer, based at least on the predicted future load distribution and the predicted future ambient weather data; and determining an optimized future power output of the transformer based on the developed cost distribution.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

Broadly contemplated herein, in accordance with at least one embodiment of the invention, are systems and methods for optimizing transformer operation in real time based on predicted load, incentive to use the transformer and transformer internal heating, as well as for evaluating the revenue earned and depreciation of life in real time operation so that the total revenue earned over the life cycle of the transformer is maximized.

Figure 1:
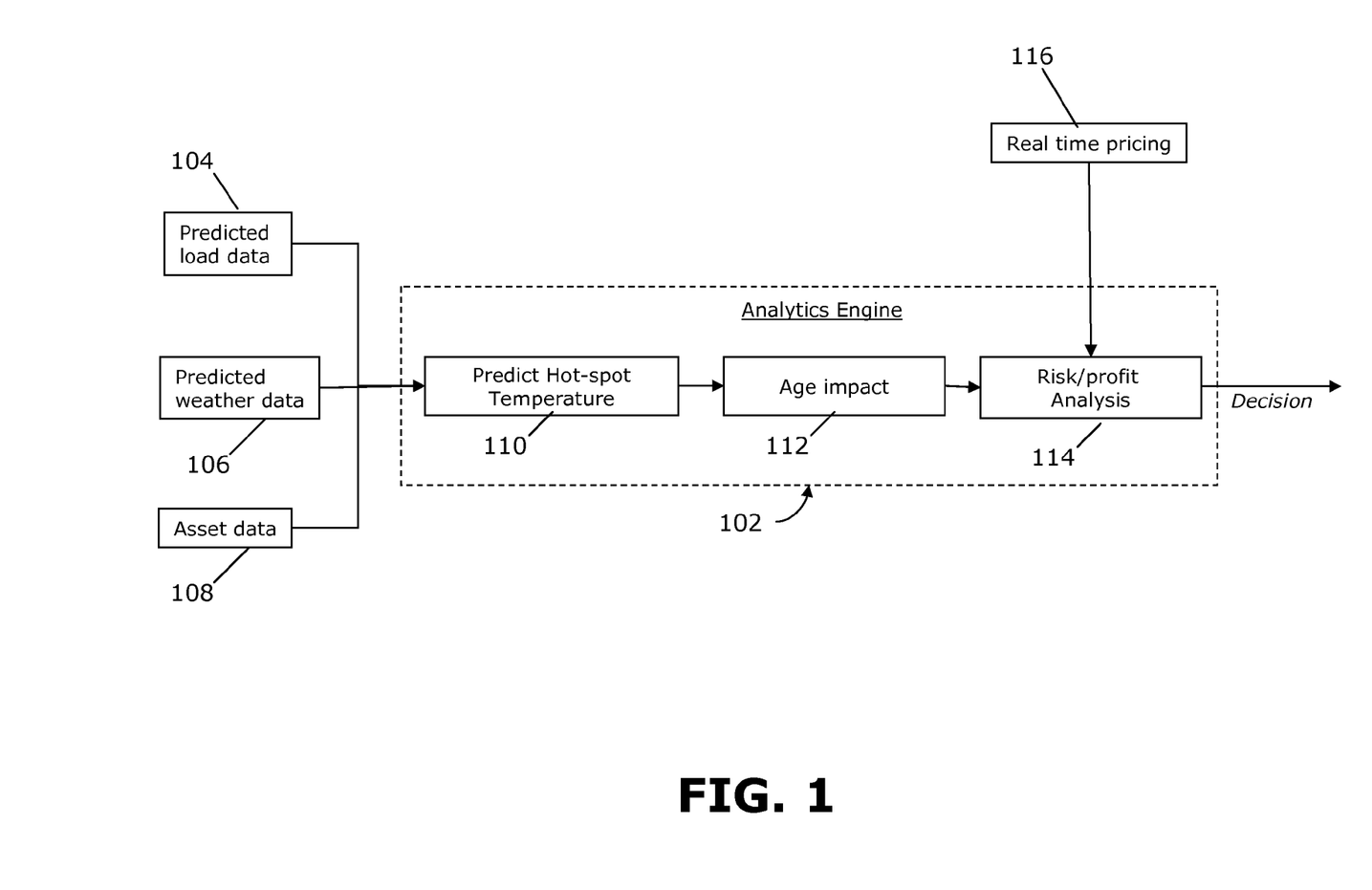
FIG. 1 schematically illustrates a system architecture.
Figure 2:
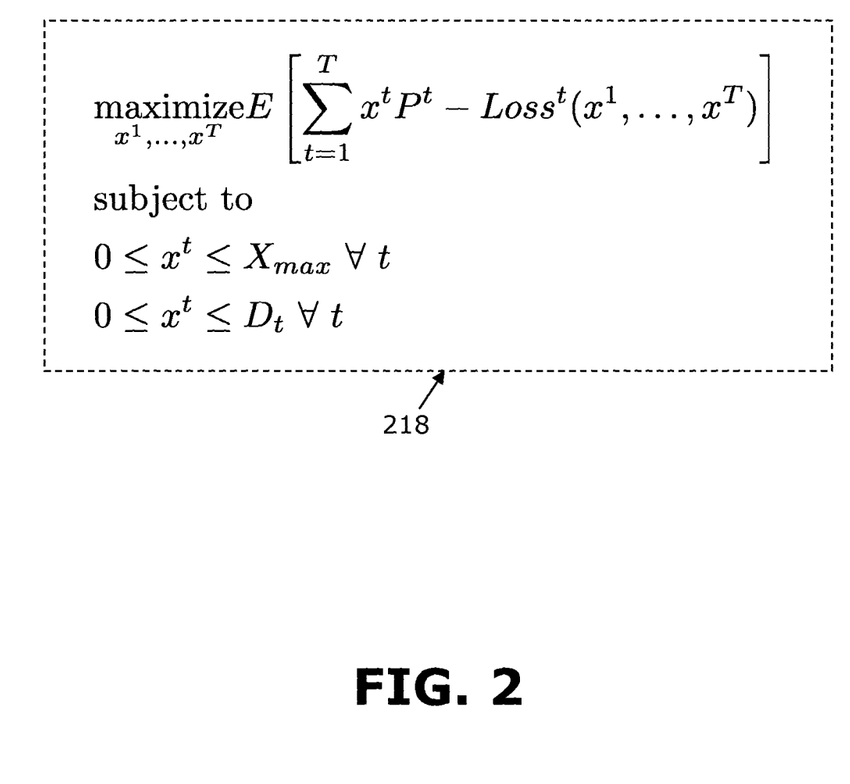
FIG. 2 sets forth an optimization problem.

FIG. 1 schematically illustrates a proposed architecture, in accordance with at least one embodiment of the invention. As shown, several types of data can be fed into an analytics engine. Among these are predicted load data 104, predicted weather data 106 and asset data 108. Predicted load and weather data (104/106), respectively, can relate to load and weather patterns over a given future time window. Asset data 108 can relate to general physical and operational characteristics of a transformer. Within analytics engine 102, the three inputs 104/106/108 (and possibly others) are combined in predicting (110) a hot-spot temperature at a given future timepoint (or time window). A quantitative impact of transformer aging (112) is then incorporated and, combined with existing considerations of real-time pricing (116), a risk/profit analysis is rendered (114) to then contribute to a final decision regarding a transformer.

By way of elaboration, in accordance with at least one embodiment of the invention, analytics engine 102, via the risk/profit analysis 114, acts as a predictor for future costs of operating a given transformer. Predicted load data 104 can incorporate historical load and demand data, from previous days, weeks, months and years (as may be deemed suitable or appropriate for harvesting meaningful data). Predicted weather data 106, likewise, can incorporate historical weather data (e.g., temperature and atmospheric pressure data). Asset data 108 can include the capacity of a transformer. (Another input can be constituted by "knowledge of grid status", that is a current quantitative status of the grid to which the transformer is connected.) Accordingly, as at least part of the risk/profit analysis 114, there is predicted a price $P^r$ for carrying electricity in future time slots (based also on current or real-time pricing patterns 116). This predicted price can preferably be represented by a probability distribution function. The risk/profit analysis 114 can also incorporate predicted demand, that is, to predict a distribution—relative to possible demand—of how the generation entity (i.e., the organization responsible for using a transformer) will make use of the distribution transformer; this predicted demand can be indicated as $D^r$.

Further elaborating, in accordance with at least one embodiment of the invention, an age impact calculation (112) can incorporate a transformer loss of life algorithm; such predictions can be made for different carried loads and different ambient temperatures, $Loss^r(x^1, \ldots, x^T)$. The risk/profit analysis engine 114 (acting as a transformer economic dispatch system) then accepts inputs as described heretofore and solves an optimization problem (indicated at 218 in FIG. 2) to output x, or the amount of power designated for a transformer to carry in a next time slot.

In accordance with at least one embodiment of the invention, problem 218 can be addressed using stochastic optimization or generic algorithms in a manner as follows. By way of example, the optimization algorithm (218) can draw a number of samples or scenarios from the price, demand, temperature and the other random quantities from the predictive distributions discussed hereinabove. In a stochastic manner, in one embodiment, one can then replace the expectation in the optimization of FIG. 2 with a summation over these scenarios and choose the x sequence that minimizes the summation. In a "genetic" embodiment, one can start with a set of seed choices for possible sequences of x's: $x^1, x^2, \ldots, x^n$. In each iteration, there are selected the best x's as measured against the set of scenarios drawn above. Given these, one can mutate or combine them to generate the next iteration (or population) of x's.

In brief recapitulation, in accordance with at least one embodiment of the invention, a cost/benefit analysis can be employed to determine the worthiness of carrying extra load on a transformer, while balancing this with how it affects transformer life.

Figure 3:
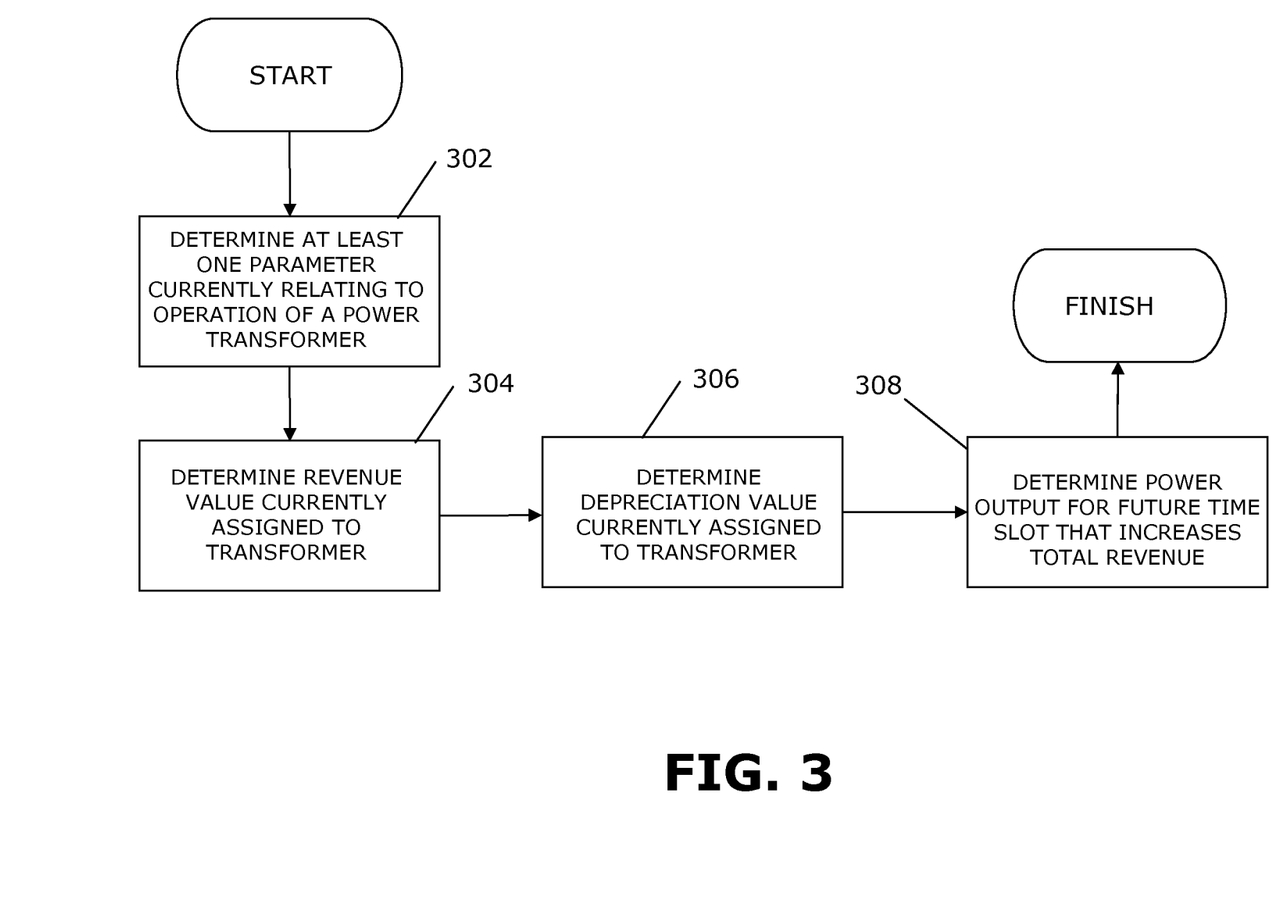
FIG. 3 sets forth a process more generally for managing implementation of a power transformer.

FIG. 3 sets forth a process more generally for managing implementation of a power transformer, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, there is determined at least one parameter currently relating to operation of a transformer (302), as well as a revenue value currently assigned to the transformer (304). There is determined a depreciation value currently assigned to the transformer (306). There is determined a power output for the transformer for a future time slot that increases total revenue with respect to a life cycle of the transformer, the power output being determined based on the at least one parameter, the revenue value, and the depreciation value (308).

Figure 4:
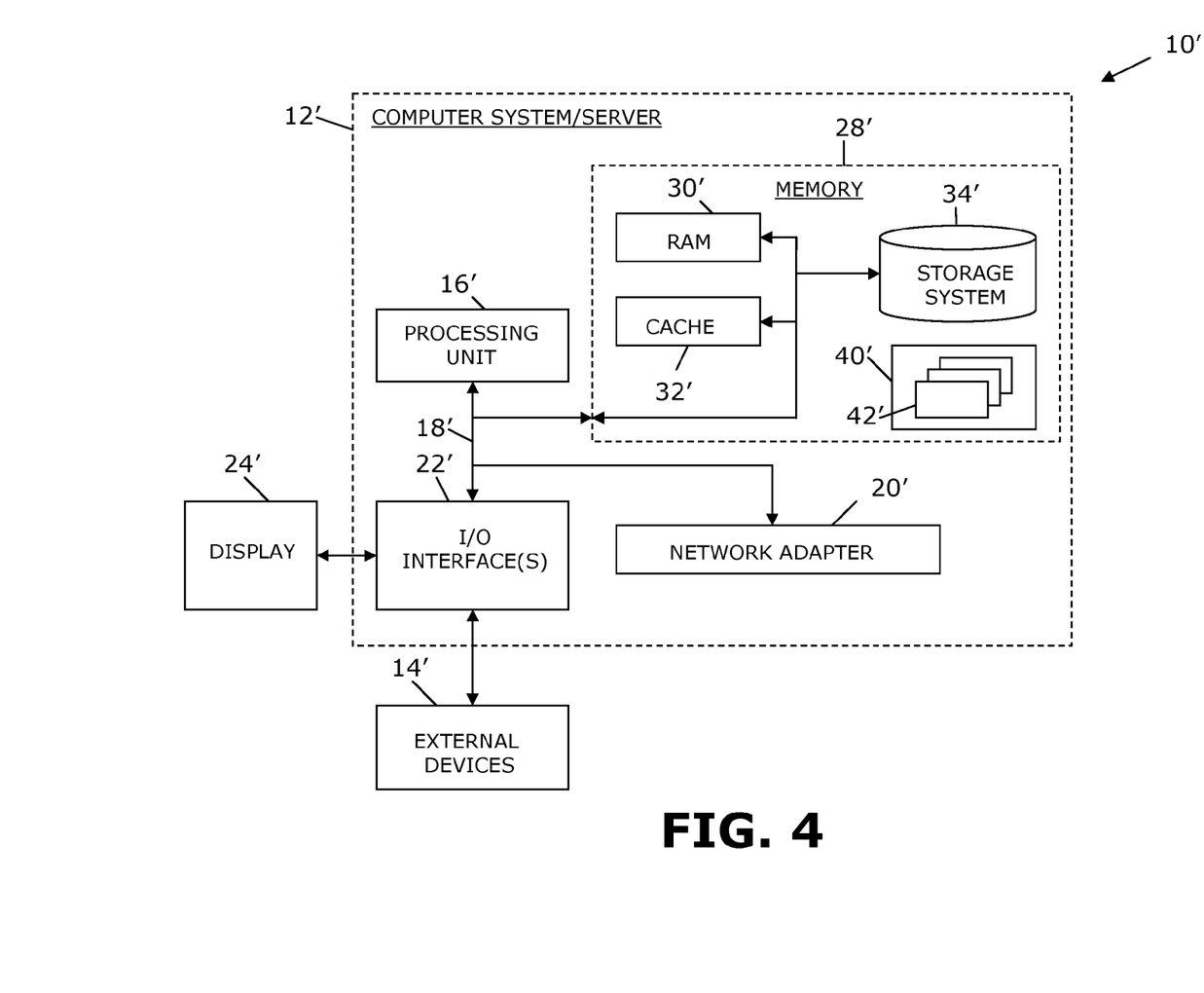
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of managing implementation of a power transformer, said method comprising:
    utilizing a processor to execute computer code configured to perform the steps of:
    determining at least one parameter currently relating to operation of a transformer;
    determining a revenue value currently assigned to the transformer;
    determining a depreciation value currently assigned to the transformer; and
    determining a power output for the transformer for a future time slot that increases total revenue with respect to a life cycle of the transformer;
    the power output being determined based on the at least one parameter, the revenue value, and the depreciation value;
    wherein said determining of a power output comprises solving an optimization problem to determine a power output designated for the transformer to carry in the future time slot;
    said solving comprising accepting as input: a predictive price distribution; a predictive demand distribution; and a predictive temperature distribution;
    the predictive price distribution being represented by a probability distribution function.

2. The method according to claim 1, wherein the at least one parameter comprises at least one member selected from the group consisting of: predicted load, incentive to use the transformer, and transformer internal heating.

3. The method according to claim 1, wherein said determining of a depreciation value comprises predicting a price for the transformer to carry electricity in at least one future time slot.

4. The method according to claim 3, wherein said predicting comprises inputting at least one parameter selected from the group consisting of: historical load, historical demand, ambient transformer conditions, transformer generation capacity, and knowledge of grid status.

5. The method according to claim 1, wherein said determining of a depreciation value comprises predicting demand related to the transformer.

6. The method according to claim 1, wherein the solving comprises applying a summation over inputs and determining at least one power output of the transformer which corresponds to minimizing the summation.

7. An apparatus for managing implementation of a power transformer, said apparatus comprising:

at least one processor; and a computer readable storage medium having computer readable program code embodied therewith and executable by the at least one processor, the computer readable program code comprising:

computer readable program code configured to determine at least one parameter currently relating to operation of a transformer;

computer readable program code configured to determine a revenue value currently assigned to the transformer;

computer readable program code configured to determine a depreciation value currently assigned to the transformer; and computer readable program code configured to determine a power output for the transformer for a future time slot that increases total revenue with respect to a life cycle of the transformer;

the power output being determined based on the at least one parameter, the revenue value, and the depreciation value;

wherein the determining of a power output comprises solving an optimization problem to determine a s power output designated for the transformer to ca in the future time slot;

the solving comprising accepting as input: a predictive price distribution; a predictive demand distribution; and a predictive temperature distribution;

the predictive price distribution being represented by a probability distribution function.

8. A computer program product for managing implementation of a power transformer, said computer program product comprising:

a non-transitory computer readable storage medium having computer readable program code embodied therewith, the computer readable program code comprising:

computer readable program code configured to determine at least one parameter currently relating to operation of a transformer;

computer readable program code configured to determine a revenue value currently assigned to the transformer;

computer readable program code configured to determine a depreciation value currently assigned to the transformer; and computer readable program code configured to determine a power output for the transformer for a future time slot that increases total revenue with respect to a life cycle of the transformer;

the power output being determining based on the at least one parameter, the revenue value, and the depreciation value;

wherein the determining of a power output comprises solving an optimization problem to determine a power output designated for the transformer to carry in the future time slot;

the solving comprising accepting as input: a predictive price distribution; a predictive demand distribution; and a predictive temperature distribution;

the predictive price distribution being represented by a probability distribution function.

9. The computer program product according to claim 8, wherein the at least one parameter comprises at least one member selected from the group consisting of: predicted load, incentive to use the transformer, and transformer internal heating.

10. The computer program product according to claim 8, wherein said computer readable program code is configured to predict a price for carrying electricity in at least one future time slot.

11. The computer program product according to claim 10, wherein said computer readable program code is configured to input at least one parameter selected from the group consisting of: historical load, historical demand, ambient transformer conditions, transformer generation capacity, and knowledge of grid status.

12. The computer program product according to claim 8, wherein said computer readable program code is configured to predict demand related to the transformer.

13. The computer program product according to claim 8, wherein the optimization algorithm applies a summation over inputs and determines at least one power output of the transformer which corresponds to minimizing the summation.

14. A method comprising:

utilizing a processor to execute computer code configured to perform the steps of:

predicting a future load distribution for a power transformer;

predicting future ambient weather data relative to the power transformer;

developing a cost distribution relative to future operation of the transformer, based at least on the predicted future load distribution and the predicted future ambient weather data;

the cost distribution being represented by a probability distribution function; and determining an optimized future power output of the transformer via solving an optimization problem that accepts as input: the developed cost distribution; a predictive demand distribution; and a predictive temperature distribution.

* * * * *